United States Patent [19]
Gellert

[11] Patent Number: 5,346,388
[45] Date of Patent: Sep. 13, 1994

[54] INJECTION MOLDING NOZZLE WHICH RETAINS A THERMOCOUPLE ELEMENT

[76] Inventor: Jobst U. Gellert, 7A Prince Street, Georgetown, Ontario, Canada, L7G 2X1

[21] Appl. No.: 106,617
[22] Filed: Aug. 16, 1993

[30] Foreign Application Priority Data
Jul. 28, 1993 [CA] Canada .................................. 2101480

[51] Int. Cl.⁵ .............................................. B29C 45/20
[52] U.S. Cl. .................................. 425/549; 264/328.15
[58] Field of Search ................... 425/549; 264/328.15

[56] References Cited
U.S. PATENT DOCUMENTS

| | | | |
|---|---|---|---|
| 4,586,887 | 5/1986 | Gellert | 425/549 |
| 4,768,283 | 9/1988 | Gellert | 425/549 |
| 4,945,630 | 8/1990 | Gellert | 425/549 |

*Primary Examiner*—Tim Heitbrink
*Attorney, Agent, or Firm*—Dalesman & Company

[57] ABSTRACT

An injection molding nozzle upon which a thermocouple element can be removably mounted and be self-retained in place. The nozzle has a front portion and a larger diameter rear collar portion with a thermocouple element duct therethrough. A thermocouple element bore extends rearwardly from the front end of the nozzle and a thermocouple element groove extends outwardly across the rear end from the thermocouple element duct. A front portion of a suitably bendable and retentive thermocouple element is inserted into the bore in the front end and bent to extend rearwardly to the duct through the rear collar portion. A rear portion of the thermocouple element is bent into place in the groove in the rear end. The thermocouple element securely retains itself in this position while the nozzle is being installed in the mold.

2 Claims, 2 Drawing Sheets

INJECTION MOLDING NOZZLE WHICH RETAINS A THERMOCOUPLE ELEMENT

BACKGROUND OF THE INVENTION

This invention relates generally to injection molding and more particularly to a heated nozzle upon which a thermocouple element can be removably mounted in a predetermined position and be securely self-retained in place.

It is well known to use a thermocouple element to continuously measure the temperature in a heated injection molding nozzle. In order to monitor the operating temperature near the gate, it is important that the thermocouple in the front portion of the thermocouple element be positioned near the front end of the nozzle. It is also very critical that the thermocouple in each nozzle be very accurately positioned. Thus the thermocouple element must be mounted so that it is securely retained in place, particularly during installation of the nozzle in the mold. An example of the thermocouple being positioned near the front end of the nozzle is shown in the applicants' U.S. Pat. No. 4,768,283 which issued Sep. 6, 1988 where the thermocouple element extends into the insulative air space through a thermocouple duct through the rear collar portion of the nozzle. While the thermocouple element is bent into a groove in the rear end of the nozzle, there is no provision for retaining the thermocouple in place during installation.

More recently, the applicants' Canadian patent application Ser. No. 2,078,890 filed Sep. 22, 1992 entitled "Injection Molding Nozzle with Thermocouple Receiving Torpedo" shows the thermocouple retained in position by a wire wrapped around the nozzle to hold the thermocouple element in place against it. In the applicants' Canadian patent application Ser. No. 2,091,409 filed Mar. 10, 1993 entitled "Injection Molding Torpedo with Thermocouple Bore" the thermocouple is held in place by the thermocouple element extending radially outward into contact against a tapered portion of the well in the mold. However, this does not ensure that the thermocouple is retained in place during installation of the nozzle in the mold.

SUMMARY OF THE INVENTION

Accordingly, it is an object of the present invention to at least partially overcome the disadvantages of the prior art by providing a heated nozzle upon which a thermocouple element can be removably mounted in a predetermined position and be securely self-retained in place.

To this end, in one of its aspects, the invention provides an injection molding nozzle having a rear end, a front end, a rear collar portion adjacent the rear end, a front portion extending forwardly from the rear collar portion, and a melt channel extending therethrough to convey melt from an inlet at the rear end towards a gate extending through the mold to a cavity, the rear collar portion having a generally cylindrical outer surface and the front portion having a generally cylindrical outer surface which is smaller in diameter than the outer surface of the rear collar portion, the nozzle to be seated in a well in a cooled mold with an insulative air space extending between the outer surface of the front portion of the nozzle and a surrounding generally cylindrical inner surface of the well, the rear collar portion of the nozzle having a thermocouple element duct extending therethrough in alignment with the insulative air space between the outer surface of the front portion of the nozzle and the surrounding inner surface of the well, having the improvement wherein the front portion of the nozzle has a thermocouple element bore extending a predetermined distance rearwardly from the front end, and the rear end of the nozzle has a thermocouple element groove extending from the thermocouple element duct to the outer surface of the rear collar portion, whereby a suitably bendable and retentive thermocouple element removably mounted with a front portion of the thermocouple element received in the thermocouple element bore and bent to extend rearwardly through the insulative air space between the outer surface of the front portion of the nozzle and the surrounding inner surface of the well and through the thermocouple element duct through the rear collar portion with a rear portion of the thermocouple element bent to extend through the thermocouple element groove in the rear end of the nozzle is securely self-retained in place.

Further objects and advantages of the invention well appear from the following description taken together with the accompanying drawings.

DETAILED DESCRIPTION OF THE INVENTION

Figure 1:
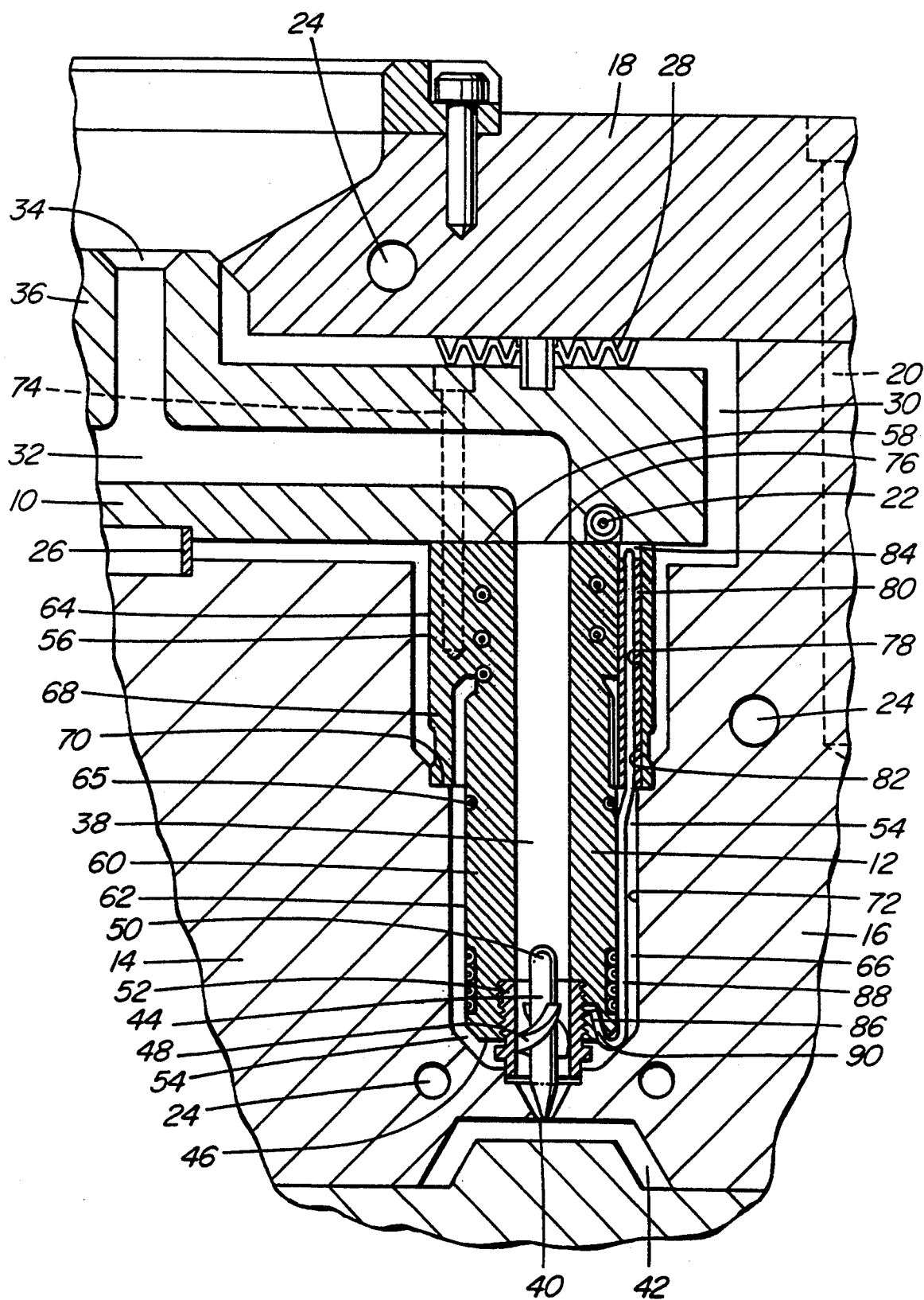
FIG. 1 is a sectional view of a portion of a multi-cavity injection molding system showing a nozzle according to a preferred embodiment of the invention.

Reference is first made to FIG. 1 which shows a portion of a multi-cavity injection molding system or apparatus having a melt distribution manifold 10 interconnecting several heated nozzles 12 in a mold 14. While the mold 14 usually has a greater number of plates depending upon the application, in this case only a cavity plate 16 and a back plate 18 which are secured together by bolts 20 are shown for ease of illustration. The melt distribution manifold 10 is heated by an integral electrical heating element 22 and the mold 14 is cooled by pumping cooling water through cooling conduits 24. The melt distribution manifold 10 is mounted between the cavity plate 16 and the back plate 18 by a central locating ring 26 and insulative and resilient spacer members 28 which provide an insulative air space 30 between the heated manifold 10 and the surrounding cooled mold 14.

A melt passage 32 extends from a central inlet 34 in a cylindrical inlet portion 36 of the manifold 10 and branches outwardly in the manifold 10 to convey melt through a central melt channel 38 in each of the heated nozzles 12. The melt then flows to a gate 40 leading to a cavity 42 through a torpedo 44 which is seated between the front end 46 of the nozzle 12 and the cavity plate 16. The torpedo 44 has a pair of spiral blades 48 connecting a central shaft 50 to an outer collar 52 which bridges another insulative air space 54 extending between the nozzle 12 and the surrounding mold 14. While the torpedo 44 is shown screwed into the front end 46 of the nozzle 12 in this configuration, in other applications a nozzle seal or gate insert can be provided to bridge the insulative air space 54.

Each steel nozzle 12 has a rear collar portion 56 adjacent a rear end 58 and a front portion 60 which extends forwardly from the rear collar portion 56. The front portion 60 has a generally cylindrical outer surface 62 which is smaller in diameter than the outer surface 64 of the rear collar portion 56. The nozzle 12 is heated by an integral electrical heating element 65 which extends around the central melt channel 38 to an external terminal 67. In this embodiment, the nozzle 12 is seated in a well 66 in the cavity plate 16 by a cylindrical insulating and locating flange 68 which extends forwardly from the rear collar portion 56 to sit on a circular shoulder 70 in the well 66. This provides the insulative air space 54 between the outer surface 62 of the front portion 60 of the heated nozzle 12 and the surrounding generally cylindrical inner surface 72 of the well 66 in the cooled mold 14. The nozzles 12 are secured by bolts 74 to the manifold in a position with the inlet 76 to the melt channel 38 in each nozzle 12 in exact alignment with one of the branches of the melt passage 32.

Figure 2:
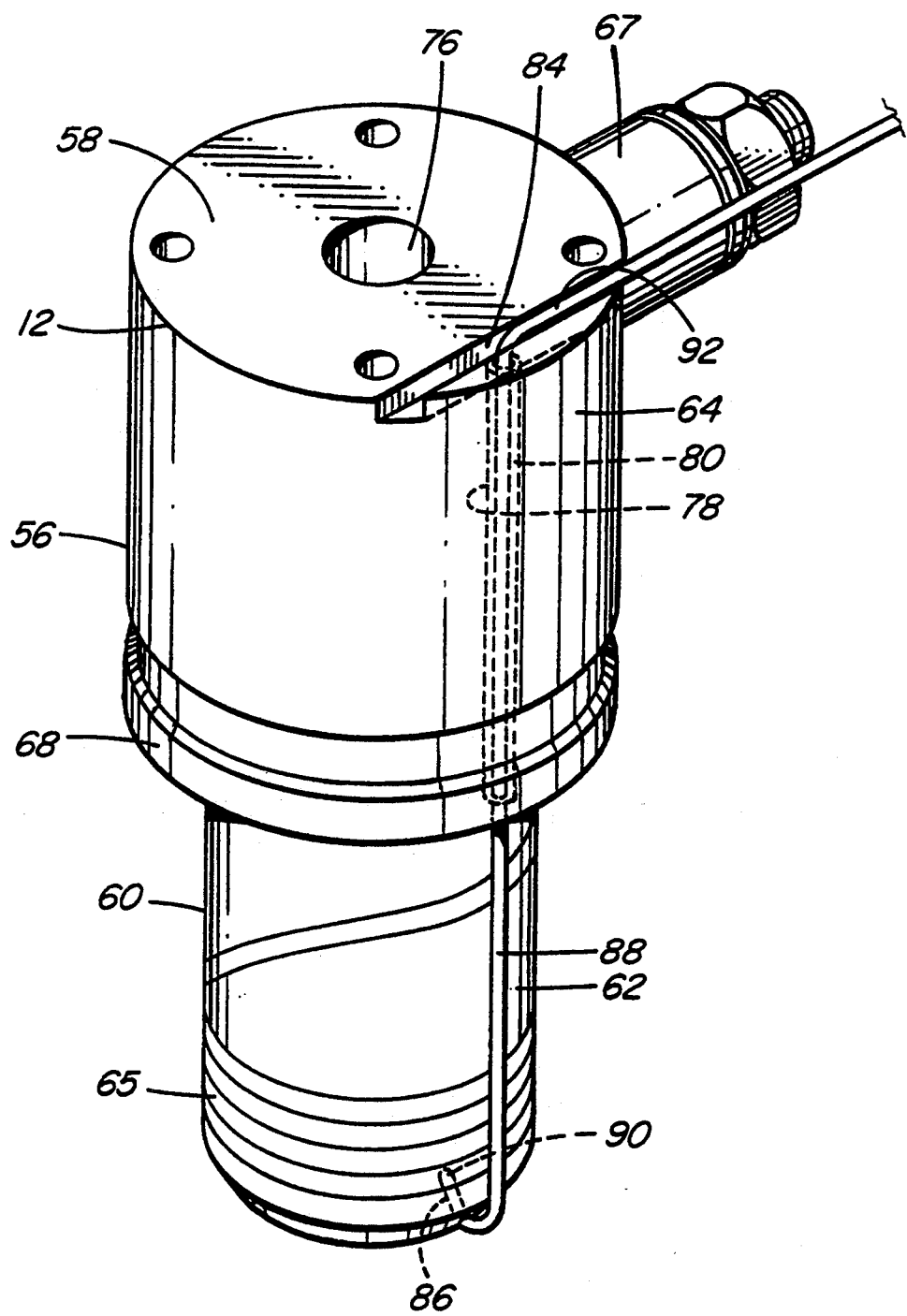
FIG. 2 is an isometric view of the nozzle and thermocouple element seen in FIG. 1.

The nozzle 12 has a thermocouple element duct 78 extending through the rear collar portion 56 to the insulative air space 54. In this embodiment, a hollow thermocouple element tube 80 made of stainless steel extends through the thermocouple element duct 78 in the rear collar portion 56 and along the inner surface 82 of the insulating and locating flange 68. The thermocouple element tube 80 is brazed in place to be an integral part of nozzle 12. As best seen in FIG. 2, a thermocouple element groove 84 extends in the rear end 58 of the nozzle 12 from the thermocouple element duct 78 to the outer surface 64 of the rear collar portion 56. Also, the front portion 60 of the nozzle 12 has a thermocouple element bore 86 extending a predetermined distance rearwardly from the front end 46. If there is sufficient room, the thermocouple element bore 86 can extend diagonally inward as shown.

Before assembly of the injection molding system or apparatus, a thermocouple element 88 is removably mounted on each nozzle 12 as seen in FIG. 2. A front portion 90 of the thermocouple element 88 having a thermocouple (not shown) is inserted as far as possible into the thermocouple element bore 86 in the front portion 60 of the nozzle 12. The thermocouple element 88 is then bent to extend rearwardly along the outer surface 62 of the front portion 60 of the nozzle 12 and through the hollow thermocouple element tube 80 in the thermocouple element duct 78 through the rear collar portion 56 of the nozzle 12. A rear portion 92 of the thermocouple element 88 is then bent to extend outwardly through the thermocouple element groove 84 in the rear end 58 of the nozzle 12. The thermocouple element 88 has leads extending in a protective casing from the thermocouple to conventional equipment (not shown) for monitoring the operating temperature. The casing is made of stainless steel or other material which is suitably bendable and retentive to be securely self-retained in place with the front portion 90 of the thermocouple element 88 extending rearwardly in the thermocouple element bore 86 and the rear portion 92 of the thermocouple element 88 extending outwardly in the thermocouple element groove 84. This ensures that the thermocouple in the front portion 60 of each thermocouple element 88 is accurately retained in position in the thermocouple element bore 86 during installation of the nozzles 12 in the mold 14.

In use, the injection molding system or apparatus is assembled as shown in FIG. 1. While only a single nozzle 12 and cavity 42 are shown for ease of illustration, it will be appreciated that the melt distribution manifold 10 normally has many more melt passage branches extending to numerous cavities 14, depending on the application. As can be seen in FIG. 1, the thermocouple element 88 extends rearwardly through the insulative air space 54 between the outer surface 62 of the front portion 60 of the nozzle 12 and the surrounding inner surface 72 of the well 66 and outwardly in the thermocouple element groove 84 in front of the melt distribution manifold 10. Electrical power is applied to the heating element 22 in the manifold 10 and to the heating elements 65 in the nozzles 12 to heat them to a predetermined operating temperature. Pressurized melt is applied from a molding machine (not shown) to the central inlet 76 of the melt passage 32 according to a predetermined cycle. The melt flows through the melt distribution manifold 10, nozzles 12, torpedoes 44, and gate 40 into the cavities 42. After the cavities 42 are filled and a suitable packing and cooling period has expired, the injection pressure is released and the melt conveying system is decompressed to avoid stringing through the open gates 40. The mold 14 is then opened to eject the molded products. After ejection, the mold 14 is closed and the cycle is repeated continuously with a cycle time dependent upon the size of the cavities 42 and the type of material being molded.

While the description of the injection molding nozzle according to the invention has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In a heated injection molding nozzle having a rear end, a front end, a rear collar portion adjacent the rear end, a front portion extending forwardly from the rear collar portion, and a melt channel extending therethrough to convey melt from an inlet at the rear end towards a gate extending through a cooled mold to a cavity, the rear collar portion having a generally cylindrical outer surface and the front portion having a generally cylindrical outer surface which is smaller in diameter than the outer surface of the rear collar portion, the nozzle to be seated in a well in the cooled mold with an insulative air space extending between the outer surface of the front portion of the nozzle and a surrounding generally cylindrical inner surface of the well, the rear collar portion of the nozzle having a thermocouple element duct extending therethrough in alignment with the insulative air space between the outer surface of the front portion of the nozzle and the surrounding inner surface of the well, having the improvement wherein;
the front portion of the nozzle has a thermocouple element bore extending a predetermined distance rearwardly from the front end, and the rear end of the nozzle has a thermocouple element groove extending from the thermocouple element duct to the outer surface of the rear collar portion, whereby a suitably bendable and retentive thermocouple element removably mounted with a front portion of the thermocouple element received in the thermocouple element bore and bent to extend rearwardly through the insulative air space between the outer surface of the front portion of the nozzle and the surrounding inner surface of the well and through the thermocouple element duct through the rear collar portion with a rear portion of the thermocouple element bent to extend through the thermocouple element groove in the rear end of the nozzle is securely self-retained in place.

2. An injection molding nozzle as claimed in claim 1 wherein the nozzle has a cylindrical locating flange extending forwardly from the rear collar portion to seat against a circular shoulder in the well in the mold, with a hollow thermocouple tube extending from the thermocouple duct in contact with the locating flange to removably receive the thermocouple therethrough.

* * * * *